United States Patent Office 3,086,062
Patented Apr. 16, 1963

3,086,062
PROCESS FOR THE PRODUCTION OF 2,4-DINITRO-1,3,5-TRIISOPROPYLBENZENE
Ernst Oltay, Aachen, and Rudolf Stroh, Leverkusen, Germany, assignors to Farbenfabriken Bayer Aktiengesellschaft, Leverkusen, Germany, a corporation of Germany
No Drawing. Filed Dec. 5, 1960, Ser. No. 73,556
Claims priority, application Germany Dec. 5, 1959
2 Claims. (Cl. 260—645)

This invention relates to a process for the preparation of 2,4-dinitro-1,3,5-triisopropylbenzene.

2,4-dinitro-1,3,5-triisopropylbenzene is an exceptionally useful chemical intermediate for a great number of chemical reactions. It can, for instance, be hydrogenated by known processes to give 2,4-diamino-1,3,5-triisopropylbenzene, which is useful for the preparation of azo dyestuffs or which can be employed as a diamine curing agent for epoxy resins. It further finds use as a cross-linking agent for polyurethane compositions, for instance, for the cross-linking reaction of polyester-polyether-reaction products with free cyanato (CNO—) radicals. The preparation of 2,4-dinitro-1,3,5-triisopropylbenzene in high yield and essentially free of 2,4,6-trinitro-1,3,5-triisopropylbenzene has not heretofore been accomplished.

The nitration of 1,3,5-triisopropylbenzene, which can readily be prepared by alkylation of benzene with propylene or by rearrangement reactions from isopropylbenzene to produce mononitro and trinitro derivatives together with a small amount of a dinitro derivative that could not be separated from the trinitro derivative, has been described in the Journal of the American Chemical Society, vol. 65, page 2437 (1943). Thus, 1,3,5-triisopropylbenzene can be converted with 96% $HNO_3$ at 30° C. in the presence of acetic acid and acetic acid anhydride into 2-nitro-1,3,5-triisopropylbenzene. It is not possible however to introduce a second nitro group, even if the quantity of the nitric acid is raised from 1.5 to 4.0 equivalents, the temperature from 30 to 70° C., and the reaction time to 20 hours. On the other hand, if the mononitro derivative is further nitrated with a mixture of sulfuric and nitric acids, 2,4,6-trinitro-1,3,5-triisopropylbenzene is readily obtained in a yield of 95%, together with a small proportion of dinitro-1,3,5-triisopropylbenzene from which the trinitro-1,3,5-triisopropylbenzene is not readily separable.

It has now been surprisingly found that 2,4-dinitro-1,3,5-triisopropylbenzene can be prepared in a substantially theoretical yield by nitration of 1,3,5-triisopropylbenzene in saturated aliphatic hydrocarbons as solvent.

Inert liquid saturated aliphatic hydrocarbon solvents which are suitable are, for example, various natural or synthetic paraffinic hydrocarbon mixtures as well as n-heptane, its isomers, n-hexane and its isomers, and n-octane and its isomers, petroleum naphtha or ether, gasoline and other petroleum hydrocarbons. The concentration of the solution is not critical.

The nitration may be effected with a mixture of nitric and sulfuric acids in conventional manner, a quantity of nitric acid being used which it at least that stoichiometrically necessary. The nitric acid concentration should be between 30 and 70% by weight, preferably from about 30 to 40%.

It is necessary to employ at least two mols of nitric acid per mol of 1,3,5-triisopropylbenzene. It is, however, possible to employ an excess of nitric acid without harm. When using, for example, a solution of 1 part by weight of 1,3,5-triisopropylbenzene in 3 parts by weight of petroleum hydrocarbons (B.P. 122–124° C.) and a nitrating acid (33% $HNO_3$ and 67% $H_2SO_4$) in 20% excess, the 2,4-dinitro-1,3,5-triisopropylbenzene is obtained at 20–30° C. in a yield of 97%.

It was unexpectedly found that no trinitrotriisopropylbenzene was produced, even when using a larger excess of $HNO_3$ and not even when the isolated dinitro compound was treated again in n-heptane with fresh nitrating acid.

On the other hand, if 1 mol of $HNO_3$ per mol of 1,3,5-triisopropylbenzene is used for the nitration, there is obtained mainly 2-mononitro-1,3,5-triisopropylbenzene together with some dinitro compound.

The process of this invention is preferably carried out at a temperature range from about 0 to about 50° C., the best results being obtained at a temperature between 20 and 30° C.

The resulting product can be isolated by conventional means, such as filtration, centrifugation, and decantation; optional work-up procedures involve the use of washing techniques, e.g., by adding water and benzene. The aqueous acid phase is separated off and the hydrocarbon phase washed with an aqueous solution of a base in order to neutralize any residual nitric acid. The nitro compound is dried in any suitable fashion, for instance, by driving off the hydrocarbon solvent while the reaction product is molten. The molten product solidifies on standing.

Pure 2,4-dinitro-1,3,5-triisopropylbenzene obtained in accordance with the process of the present invention has a melting point of 138–139° C.

*Example*

306 parts by weight of 1,3,5-triisopropylbenzene are dissolved in 1100 parts by weight of a saturated aliphatic hydrocarbon and placed in a three-necked flask. A nitrating acid is prepared from 227 parts by weight of $HNO_3$ and 441 parts by weight of $H_2SO_4.H_2O$ with stirring and cooling, and this acid is introduced portionwise at such a rate into the solution of 1,3,5-triisopropylbenzene with vigorous stirring that the temperature of the reaction mixture can be maintained between 25 and 30° C. by cooling with ice and water. The addition of the acid in the specified amount takes about 30 minutes. After about half the quantity of the nitrating acid has been introduced, finely divided crystals precipitate. The reaction mixture is then stirred for another 2 hours after addition of the remainder of the nitrating mixture and 300 parts by weight of finely crushed ice are then added. 800 parts by weight of benzene are introduced to dissolve the precipitated 2,4-dinitro-1,3,5-triisopropylbenzene. After the said compound is completely dissolved, the acid phase is separated and discarded after the mixture has been allowed to stand for half an hour, since it does not contain any nitro compound.

The hydrocarbon phase is then washed successively with water, 2% $Na_2CO_3$-solution and once again with water. The benzene is driven off from the resulting completely neutral solution by heating it to a temperature of 85° C. at atmospheric pressure and the hydrocarbon solvent is driven off as the temperature gradually increased to 110° C. at a final pressure of 200 mm. Hg. The molten 2,4-dinitro-1,3,5-triisopropylbenzene is transferred at a temperature higher than 95° C. to a drying plate. After solidification, the crystalline product is loosened and placed in a vacuum drying chamber, in which the last traces of the solvent are removed at a pressure of 200 mm. Hg, in 24 hours, at room temperature.

The quantity of the 2,4-dinitro-1,3,5-triisopropylbenzene thus obtained is 426 parts by weight. The crude product has a melting point of 121–123° C. The yield is 96.7% based on the initial 1,3,5-triisopropylbenzene introduced.

*Analysis.*—Calc.: C, 61.2%; H, 7.5%; N, 9.5%; mol.

wt., 294. Found: C, 60.9%; H, 7.5%; N, 9.4%; mol. wt., 280.

We claim:

1. A process for the production of 2,4-dinitro-1,3,5-triisopropylbenzene which comprises nitrating 1,3,5-triisopropylbenzene in an inert liquid saturated aliphatic hydrocarbon solvent.

2. A process as defined in claim 1 in which the nitrating agent is a mixture of nitric and sulfuric acids.

References Cited in the file of this patent

Newton: American Chemical Society Journal, vol. 65, pages 2437 and 2438.